(12) United States Patent
Murad-Bickard (10) Patent No.: US 12,508,653 B2
(45) Date of Patent: Dec. 30, 2025

(54) METHOD FOR MANUFACTURING AN IMPELLER

(71) Applicant: Cryostar SAS, Hesingue (FR)

(72) Inventor: Anny Murad-Bickard, Hesingue (FR)

(73) Assignee: Cryostar SAS, Hesingue (FR)

( * ) Notice: Subject to any disclaimer, the term of this patent is extended or adjusted under 35 U.S.C. 154(b) by 0 days.

(21) Appl. No.: 18/842,699

(22) PCT Filed: Mar. 1, 2023

(86) PCT No.: PCT/EP2023/025094
§ 371 (c)(1),
(2) Date: Aug. 29, 2024

(87) PCT Pub. No.: WO2023/165737
PCT Pub. Date: Sep. 7, 2023

(65) Prior Publication Data
US 2025/0170652 A1     May 29, 2025

(30) Foreign Application Priority Data
Mar. 4, 2022  (EP) ..................................... 22315047

(51) Int. Cl.
| | |
|---|---|
| *B22F 10/66* | (2021.01) |
| *B22F 5/04* | (2006.01) |
| *B22F 10/62* | (2021.01) |
| *B33Y 40/20* | (2020.01) |
| B33Y 10/00 | (2015.01) |

(52) U.S. Cl.
CPC .............. *B22F 10/66* (2021.01); *B22F 10/62* (2021.01); *B33Y 40/20* (2020.01); *B22F 5/04* (2013.01); *B33Y 10/00* (2014.12)

(58) Field of Classification Search
None
See application file for complete search history.

(56) References Cited

U.S. PATENT DOCUMENTS

| | | | |
|---|---|---|---|
| 9,903,207 B2* | 2/2018 | Tozzi ..................... | F04D 29/284 |
| 10,851,653 B2* | 12/2020 | Rettberg ............... | F04D 29/284 |
| 10,907,654 B2* | 2/2021 | Feustel ................. | F04D 29/284 |

(Continued)

FOREIGN PATENT DOCUMENTS

| | | |
|---|---|---|
| CN | 108 468 654 A | 8/2018 |
| CN | 211 573 859 U | 9/2020 |

(Continued)

OTHER PUBLICATIONS

Translation of EP_3281728_A1 (Year: 2018).*
Translation of JP-2017517635-A (Year: 2017).*

*Primary Examiner* — Jacob J Cigna
(74) *Attorney, Agent, or Firm* — Millen, White, Zelano & Branigan, P.C; Brion P. Heaney (57) ABSTRACT

A method for manufacturing an impeller, in particular, for a turbomachine, said impeller comprising vanes forming channels in the impeller, the method comprising the following steps: a) forming a raw impeller part by means of additive manufacturing; b) removing), from the raw impeller part, at an inner surface of at least one channel, material in a first area and in a second area of the inner surface, by means of post-processing, to obtain an intermediate impeller part; and c) removing, from the intermediate impeller part in the first area, material by means of machining.

15 Claims, 5 Drawing Sheets

(56) References Cited

U.S. PATENT DOCUMENTS

| | | | |
|---|---|---|---|
| 10,946,487 B2 * | 3/2021 | Dommermuth | B23P 15/006 |
| 2015/0017013 A1 * | 1/2015 | Tozzi | B23K 15/0006 |
| | | | 416/227 R |
| 2017/0314576 A1 | 11/2017 | Jonen | |
| 2019/0134779 A1 | 5/2019 | Kawasumi et al. | |
| 2019/0145430 A1 | 5/2019 | Feustel et al. | |
| 2025/0012294 A1 * | 1/2025 | Sgambati | F01D 5/288 |

FOREIGN PATENT DOCUMENTS

| | | | | | |
|---|---|---|---|---|---|
| EP | 3281728 | A1 | * | 2/2018 | |
| JP | 2014094433 | A | * | 5/2014 | |
| JP | 2017517635 | A | * | 6/2017 | B22F 7/06 |

* cited by examiner

METHOD FOR MANUFACTURING AN IMPELLER

BACKGROUND

The present invention relates to a method for manufacturing an closed impeller for a radial turbomachine.

Turbo machines like compressors, expanders and pumps can be used in different applications. For example, in cryogenic applications, i.e. applications with process gases at cryogenic temperatures, e.g., plants for air separation or the like, cryogenic turbo machines like turbo expanders and/or compressors are often used. Such turbo machines typically comprise an expander impeller and/or a compressor impeller, which are fixed on a shaft.

Impellers for such turbo machines can have an open design or a closed design, in which vanes of the impeller form channels. An advantage of the closed design is a higher isentropic efficiency of the impeller. In certain process conditions, often at very low specific speeds and high rotational speeds, an ideal geometry of such channels leading to the best efficiency cannot be machined by conventional subtractive techniques. The impeller has to be left open (i.e., the impeller is in open design) in these cases, involving a loss of efficiency. It is therefore an object of the present invention to provide an improved impeller. Similar processes are already described by EP3281728 A1 or US2019/0134779 A1.

DISCLOSURE OF THE INVENTION

This object is achieved by providing a method for manufacturing an impeller. Embodiments of the invention are the subject of the dependent claims and of the description that follows.

The invention relates to manufacturing an a closed impeller, for a radial turbomachine like an expander, compressor or pump. Such impeller comprises vanes forming channels (for operating medium) in the impeller.

As mentioned above, an ideal geometry of such channels leading to the best efficiency, typically, cannot be machined by conventional subtractive techniques. The impeller has to be left open, i.e., the impeller is in open design, in these cases. Additive manufacturing techniques allow to build closed impellers, either by supporting the downskin areas with tethering structures when necessary, or by using even more challenging techniques allowing to print downskin surfaces without support down to an angle of 0° to horizontal. However, after supports removal, or also in case of no supports at all, the surface roughness inside the channels is far from the expected criteria and the gain in efficiency caused by closing the impeller can be lost due to the surface roughness, as it has turned out.

Post-processing techniques can improve an impeller obtained by means of additive manufacturing, but not to the level of a milled component. In addition, it has turned out that surface roughness has a very detrimental effect on the fatigue lifetime of additively printed components. The fatigue lifetime of an as-printed component, typically, has to be divided by a factor of ten compared to the lifetime achieved by the same component being machined, for example at Ra=1.6 μm.

Further, it has turned out that a closed impeller is submitted to vibration modes in its operating speed range. When these modes are excited, some areas inside the channels, mostly at the surface, are submitted to a very high cyclic loading. It is thus not acceptable to keep a lesser surface roughness than the one provided at the milled-machined condition in areas submitted to fatigue loadings.

In view of this, a multi-step method for manufacturing an impeller is proposed. First, a raw impeller part is formed by means of additive manufacturing. For example, so-called powder bed fusion additive manufacturing can be used. Next, material is removed, from said raw impeller part, at an inner surface of at least one channel, in a first area and in a second area of said inner surface, by means of post-processing, to obtain an intermediate impeller part. Such post-processing can comprise at least one of the following techniques: chemical surface treatment, physical surface treatment, mechanical surface treatment or electrical surface treatment. Next, material is removed, from said intermediate impeller part in said first area, by means of machining.

Said first area is located, preferably, closer to an opening of said channel than said second area. It is preferred to first carry step b) and afterwards step c) but it can be also carried out in different order.

This allows the manufacturing of, closed impellers, with very long, thin and twisted channels which are not machinable by any subtractive technique alone and without any loss of isentropic efficiency and fatigue lifetime. While most parts of the channel, said first area, can be machined, parts, which are not machinable (said first area) can still be provided with sufficiently smooth surface by means of post-processing of the additively manufactured part. It is noted that said second area can also be defined such that it comprises parts of the surface, which might be machinable but only with very complex machines, or the like.

Preferably the surface in the first area and the second area after step b) has a roughness $R_a1$ from 3 till 10 μm, preferably 3 μm.

Preferably the surface in the first area after step c) has a roughness Ra2, which is smaller than Ra1 and preferably at or below 1.6 μm.

An advantageous way of forming said raw impeller part is such that said raw impeller part comprises, at said inner surface of said at least one channel, extra material in excess of a design contour of said inner surface, said extra material extending into the interior of the channel, forming a factual contour of said inner surface (in contrast to said design contour), wherein in said second area a thickness of said extra material is less than in at least part of said first area. Said design contour is the contour or geometry the channel or its surface shall have after all manufacturing steps will be finished. In order to achieve suitable thicknesses of said excess material, a model for the additive manufacturing can be adjusted to include said extra material with respect to the actual desired surface geometry.

The thickness of said extra material is, preferably, uniform within said second area. In this way, in the post-processing step, which typically removes material from the surface uniformly, the desired design contour of the surface in the second area is achieved.

Preferably, in an intermediate region, which is part of said first area and connecting to said second area, a thickness of said extra material changes from the thickness in said second area into the thickness in said first area (outside the intermediate region). In particular, a transition of the thickness of said extra material at a border between said second area and said intermediate region is tangential with respect to said design contour of said inner surface. Similarly, a transition of the thickness of said extra material at a border between said intermediate region and the remaining part of said first area can be tangential with respect to said design contour of said inner surface. In other words, the factual contour formed by the extra material at the borders is differentiable or has a differentiable form. This avoids any abrupt connections between the areas after machining. At least part of remaining extra material in said intermediate area can also be removed by means of machining.

The suggested method is especially applicable to materials which produce a lot of borderline porosities and a poor surface finish when they are printed (i.e., additively manufactured). Borderline porosities are very harmful for the fatigue lifetime. The poor surface finish is harmful for the fatigue lifetime and for the isentropic efficiency of the impeller.

Further advantages and embodiments of the invention will become apparent from the description and the appended figures.

It should be noted that the previously mentioned features and the features to be further described in the following are usable not only in the respectively indicated combination, but also in further combinations or taken alone, without departing from the scope of the present invention.

DETAILED DESCRIPTION OF THE FIGURES

Figure 1:
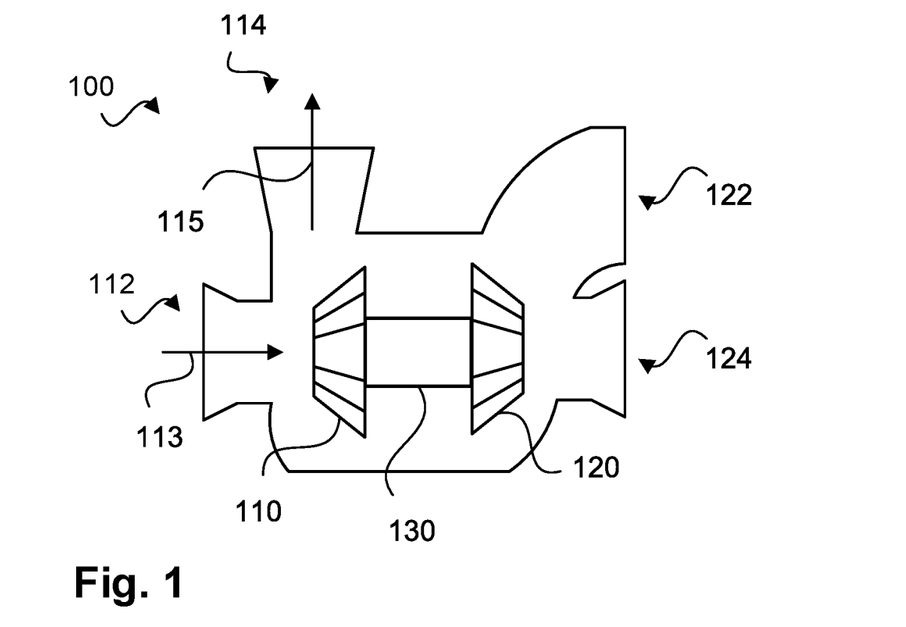
FIG. 1 illustrates a turbo machine with impellers according to a preferred embodiment of the invention.

FIG. 1 schematically illustrates a turbo machine 100 according to a preferred embodiment of the invention. The turbo machine 100, e.g., a cryogenic turbo machine is, by means of example, configured as a compressor and an expander, i.e., both are combined in one turbo machine. Turbo machine 100 comprises, hence, two impellers, an impeller 110 and an impeller 120, both mounted on a shaft 130. The turbo machine 100 comprises channels 112 and 114 on the side of the impeller 110, the channels used respectively as inlet channel and outlet channel for the operating medium or fluid, see arrow 113, to be compressed and afterwards be led out, see arrow 115. The turbo machine 100 further comprises channels 122 and 124 on the side of the impeller 120, the channels used respectively as inlet channel and outlet channel for the operating fluid to be expanded. Thus, the impeller 110 is a compressor impeller and the impeller 120 is an expander impeller.

Figure 2:
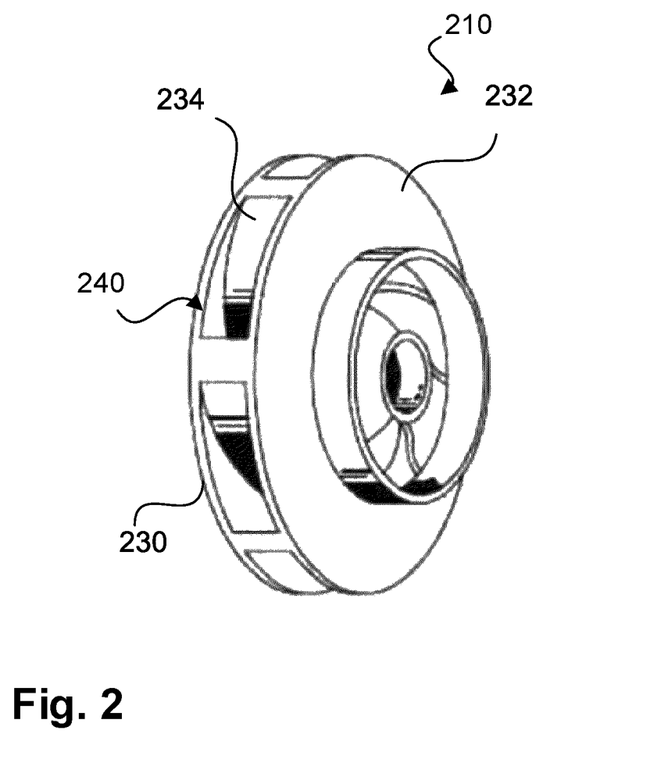
FIG. 2 illustrates an impeller according to a further preferred embodiment of the invention.

FIG. 2 schematically illustrates an impeller 210 according to a further preferred embodiment of the invention. While the impellers 110, 120 in FIG. 1 are shown schematically, impeller 210 is shown as a closed impeller, i.e., an impeller in closed design. Impeller 210 comprises multiple vanes 234, which are enclosed by two shrouds or plates 230 and 232. In this way, channels 240 are formed between two of such vanes and the plates. As can be inferred from FIG. 2, machining of such channels 240, in particular, in inner areas, might be complicated or not possible at all.

Figure 3:
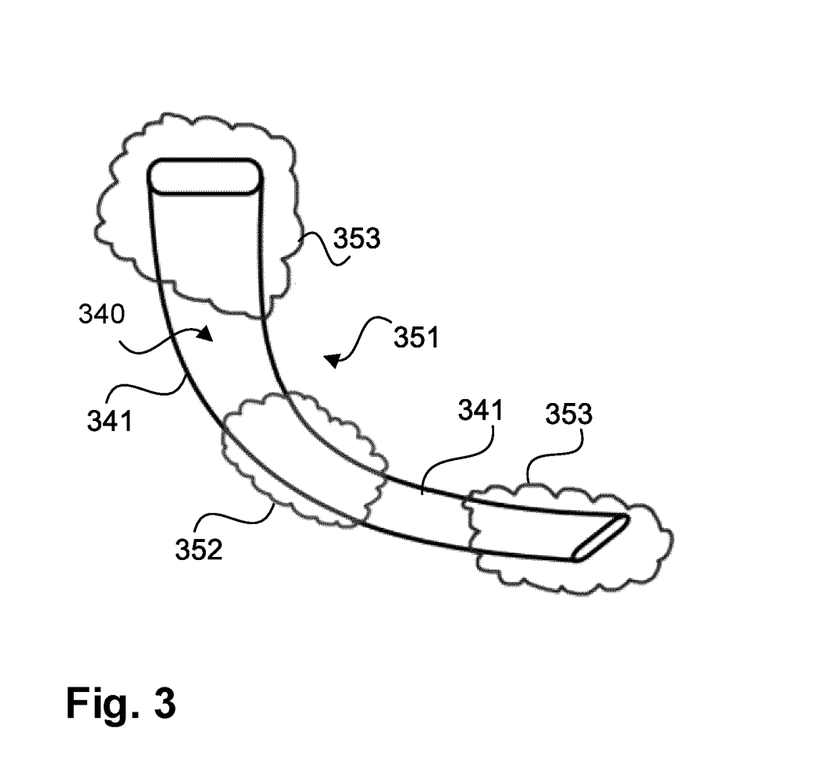
FIG. 3 illustrates a channel of an impeller with different areas.

FIG. 3 illustrates, schematically, a channel 340, which might be one of or similar to the channels 240 shown for the impeller 210 in FIG. 2. Channel 340 is shown in a cross section and a top-view of the channel. An inner surface of the channel 340 is indicated by reference numerals 341. As mentioned earlier, some parts or areas of such an inner surface might not be machinable due to specific geometry of the channel 340. Such an area, which is not machinable, is indicated with 352 (encircled). Other areas outside area 352, like area(s) 351, however, are machinable.

In addition, an impeller can be analysed to determine the vibration modes and to locate the areas submitted to fatigue loadings if one of the critical frequencies is excited. Areas that might be submitted to high fatigue loadings are indicated with reference numerals 353 (encircled) in FIG. 3. If an area 353 is partially superimposed to an area 352, some fatigue issues may happen when the impeller is put in operation. If areas 352 and 352-353 are totally disconnected like in the schematic of FIG. 3, this ensures that no fatigue issues will happen.

Figure 4:
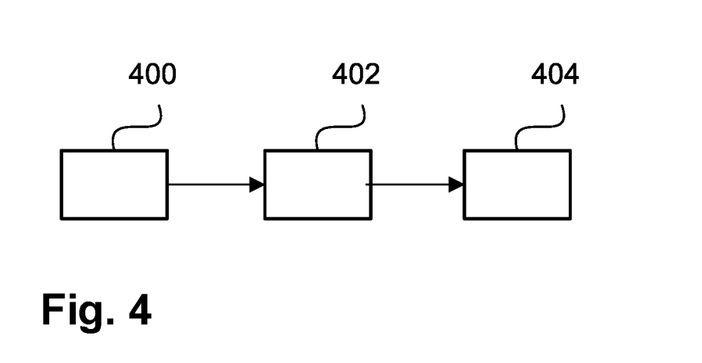
FIG. 4 illustrates a method according to a preferred embodiment of the invention in a flow diagram.

FIG. 4 illustrates, by means of a flow diagram, a method according to a preferred embodiment of the invention in a flow diagram. The method comprises different steps. In a step 400, a raw impeller part is formed by means of additive manufacturing. In a step 402, material is removed from said raw impeller part, at an inner surface of at least one channel, in a first area and in a second area, by means of post-processing, to obtain an intermediate impeller part. In a step 404, material is removed from said intermediate impeller part in a said first area by means of machining.

Figure 5A:
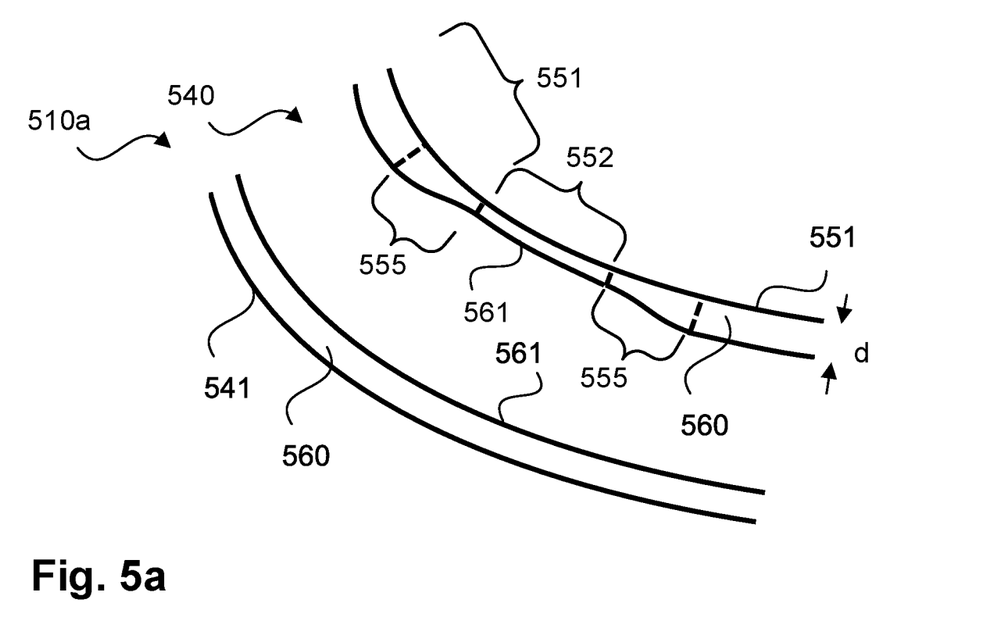
FIG. 5 illustrates a channel of an impeller with different areas.
Figure 5B:
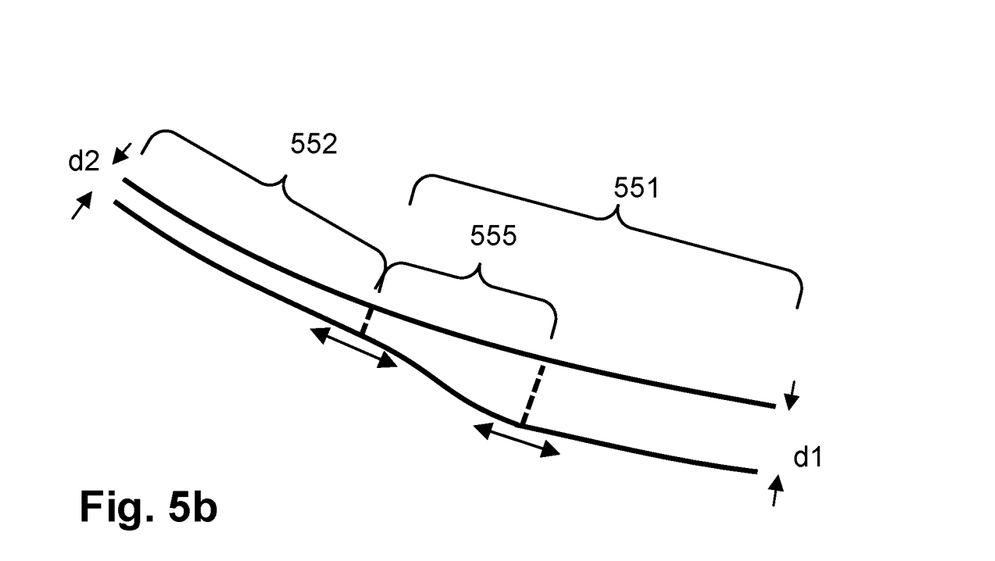

The steps will be described in more detail in the following with reference to FIGS. 5a to 5c, which illustrate a channel of an impeller with different areas. FIG. 5a illustrates a raw impeller part 510a, which is additively manufactured, for example, according to a 3D raw model. Such raw model—and the resulting raw impeller part—differs from the final or design impeller or a respective model, because extra material will be added at the inner surface, preferably, at every region of inner surfaces. FIG. 5a illustrates a channel 540 of an impeller, which basically can correspond, for example, to channel 340 shown in FIG. 3. A design contour of the inner surface of said channel 540 is illustrated by lines 541.

The raw model, according to which the raw impeller part 510a is additively manufactured, comprises at the inner surface of said channel 540, extra material 560 in excess of said design contour 541; said extra material 560 extends into the interior of the channel. Thus, the factual contour 561 of the inner surface of the raw impeller part 510a is different from the design contour 541. It is noted that such extra material typically is of the same material as the remaining parts of impeller. The design contour 541 shown in FIG. 5a will not be visible be otherwise tangible in the actual raw impeller part. Rather, this design contour 541 corresponds to the final inner surface of the channel after all manufacturing steps will be finished.

A thickness of said extra material 560 is generally indicated with reference numeral d. Depending on the area of the inner surface, this thickness is different. In a second area 552 (which is not machinable, note that there might be several first areas) the thickness is less than in at least part (which is far from the second area) of a first area 551 (which is machinable). The extra material in such area 552 corresponds to extra material with a thickness that will be removed by the step of post-processing. The extra material in such first area 551 corresponds to extra material with a thickness that will be removed by the step of post-processing and, in addition, extra material that will removed by the step of machining. A thickness of such extra material added in said first area 551 is, preferably, at least 1 mm but it must not completely close the thinnest entry of the channel. This thickness will be partially reduced during the post-processing step and eventually totally removed by the machining step.

In an intermediate region 555, which is part of said first area 551 (i.e., the intermediate region is machinable) and connecting to the second area 552 (there may be several such intermediate regions) the thickness of the extra material changes from the lower thickness d2 like in the second area 552 to the higher thickness d1 in the first area 551 (far from the second region; outside the intermediate region). Such a progressive transition between the thickness in the second area 551 to the thickness in the first area 551 is illustrated in FIG. 5*a* and, in more detail, in FIG. 5*b*.

The extra material (or the thickness layer) in said intermediate region 555 shall preferably have a specific shape. The connection between the thickness in said intermediate area 555 and the thickness in said second area 552 at the border between the second area and the intermediate region), preferably, is tangential. A tangential connection shall, in particular, mean that the factual contour of the inner surface in this region shall have a differentiable form. Also, the connection between the intermediate area 555 and the remaining part of the first area 551 is, preferably, tangential, as illustrated by means of double arrows in FIG. 5*b*.

The transition from the lower to the higher thickness of said extra material should begin near or at the border of the second area 552 (not machinable); otherwise the risk that the connection between the first area 551 and the second area 552 would be abrupt after machining, might occur.

Additive manufacturing, preferably, made as much as possible with no supports. Printing technologies allowing 0° downskin angles to horizontal are be preferred. This step can also comprise stress relief and/or hardening heat treatments and/or HIP (Hot Isostatic Pressing) treatments that shall be made on the geometry of the raw impeller part.

After the additive manufacturing step 400, the extra material in excess of the design contour 541 will be (as good as possible) be removed in the next steps 402, 404. To explain that, a new representation of the offsets (extra material) will be adopted, which does not depend on the location in the channel, but which depends on the ablation process.

Figure 5C:
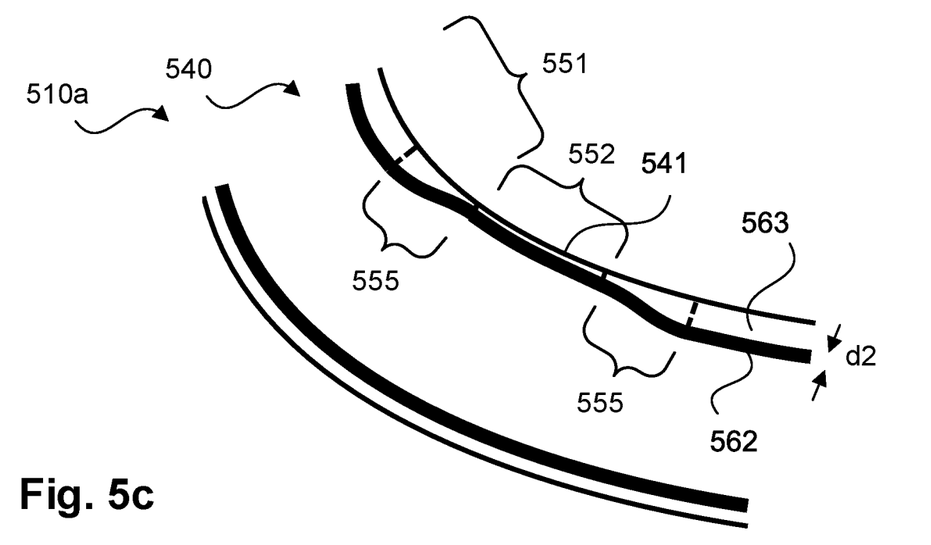

This is illustrated in FIG. 5*c*. The extra material in the first and second area and intermediate region is now divided into extra material 562 (indicated with a thick line) for post-processing and extra material 563 for machining. Extra material 562 and extra material 563 stand respectively for material to be removed by post-processing and material to be removed by machining, for example, 5-axis milling or EDM or any other subtractive machining technique Step 402 of (surface) post-processing can be achieved by any technique of surface post-processing like chemical and/or physical and/or mechanical surface treatment or any combination of these techniques.

Calibration tests can be carried-out to set the process parameters that will ensure the removal of the whole material 562. The final or design contour 541 shall already be present in said second area 552 after the post-processing, which removes material 562. This can be seen in FIG. 5*c*. The calibration can be made on a simplified structure reproducing the geometry of one channel, for example. In such calibration, it can be determined, for example, which kind of post-processing should be applied for how long in order to remove the material 562 as exactly as possible.

It is not a problem if some of material 562 remains after this post-processing step provided it is only in the first area 551. Conversely, it is not a problem if a part of material 563 has been slightly removed during the post-processing step, provided the final contour is preserved in all of the second area 552.

Figure 5D:
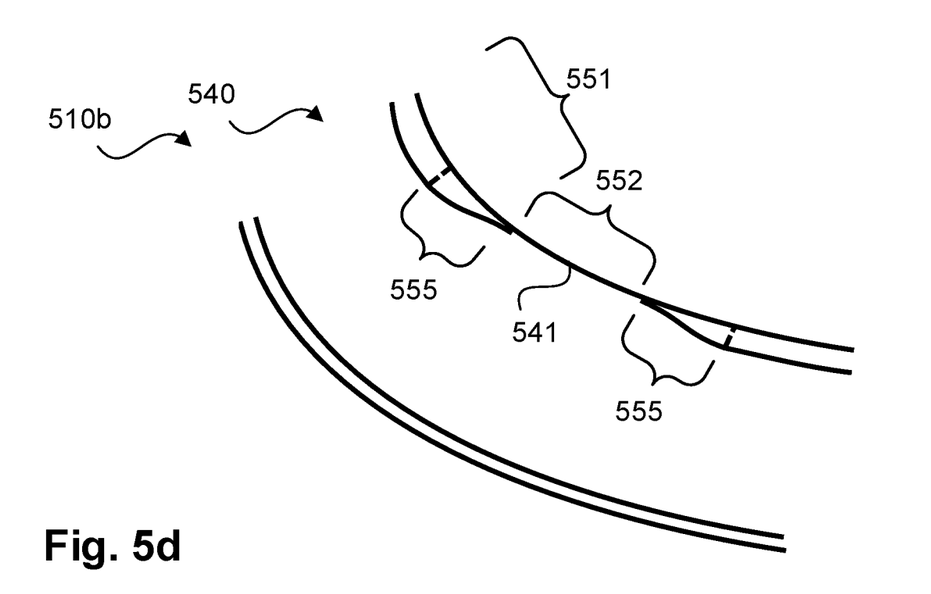

At the end of this step 402, an intermediate impeller part 510*b* is obtained, and the channel will look like illustrated in FIG. 5*d*. The surface finish of the second area 552 will ideally be less than Ra=10 μm.

Step 404, the machining, can be carried out on the entire first area 551, including the intermediate region 555, to remove the extra material 563 by, for example, conventional 5-axis milling and the target Ra will be the one specified for machining operations.

The connection of or border between the first and second area is of importance in terms of geometrical accuracy. There should be no major step between the surface left after post-processing and the surface left after machining. If there is such a step, it means that the post-processing step has not been performed properly and that the calibration of the removed thickness by post processing should be readjusted.

Figure 5E:
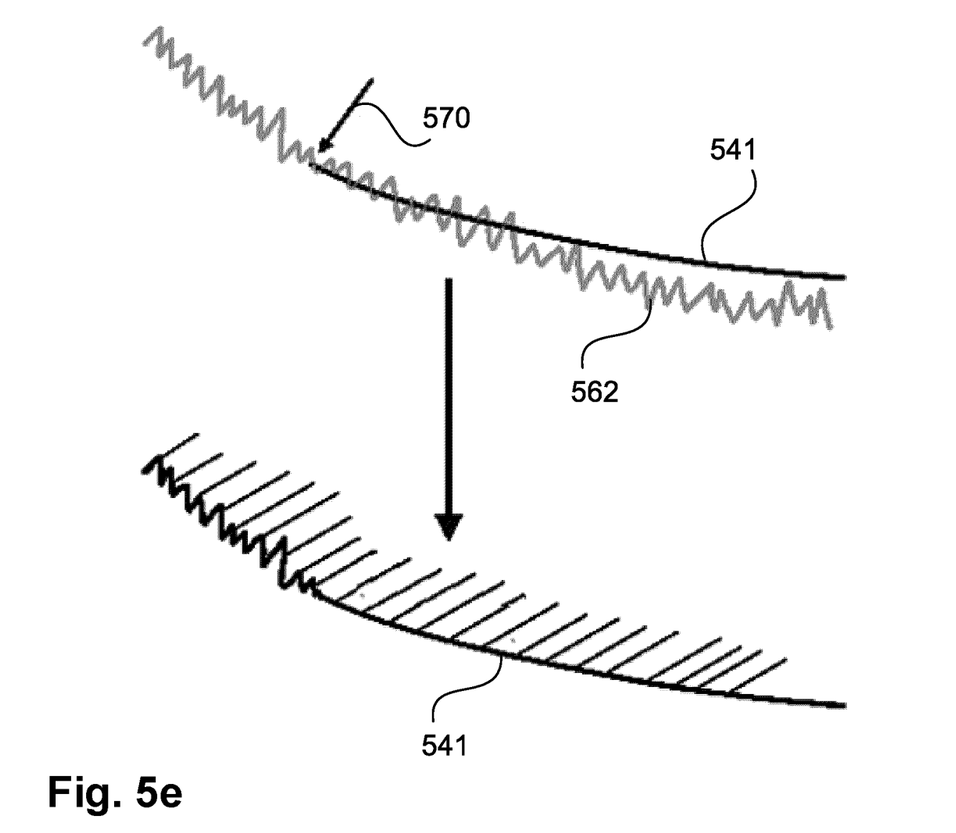

As illustrated in FIG. 5*e*, the contour 562 after post processing is somewhat rough (see upper diagram). The connection of or border (see arrow 570) between the first and second area should be tangential (differentiable) and the drill should not remove some material anymore at the end of its way inside the channels. Thus, a path for the machining might be equal to the design contour 541. After the step of machining, the surface in the first area is smooth (see lower diagram).

The full external contour of the impeller can then be machined so that eventually, the only area which has not been machined is said second area, which will remain with a surface process produced by the post-processing method.

The invention allows the production of a closed impeller whose channel cannot be machined entirely. The surface finish in critical areas regarding fatigue loadings will be the one of a fully machined impeller so no lifetime reduction will occur. The surface finish of the internal channels will be, for the majority, the one of a machined impeller, except in the inaccessible area which exhibit the surface finish of the post processing method, therefore the isentropic efficiency of the closed impeller will be much better than the efficiency of the same open version.

The invention applies, in particular, to all impellers for radial turbines, compressors or pumps in which the only limitation to install a closed impeller is the impossibility to machine the central part of the channels because of the too bent and twisted shape of the channels.

The invention claimed is:
1. A method for manufacturing a closed impeller, for a radial turbomachine, said impeller comprising vanes forming channels in the impeller, the method comprising:
   a) forming a raw impeller part by means of additive manufacturing;
   b) removing, from said raw impeller part, at an inner surface of at least one channel, material in a first area and in a second area of said inner surface, by means of post-processing, to obtain an intermediate impeller part, wherein said first area is located closer to an opening of the channel than said second area;
   wherein the post-processing comprises at least one of the following techniques:
      chemical surface treatment, physical surface treatment, mechanical surface treatment, electrical surface treatment, and wherein the surface in the first area and the second area after b) has a roughness $R_a1$ from 3 to 10 μm; and c) removing, material from said intermediate impeller part in said first area, material by means of machining, wherein the second area is only treated with step-b), and wherein the surface in the first area after c) has a roughness $R_a2$, which is smaller than $R_a1$.

2. The method of claim 1, wherein the surface in the first area after step c) has a roughness $R_a2$, which is at or below 1.6 µm.

3. The method of claim 1, wherein the surface in the first area and the second area after b) has a roughness $R_a1$ of about 3 µm.

4. The method of claim 3, wherein the surface in the first area after c) has a roughness $R_a2$, which is at or below 1.6 µm.

5. The method of claim 1, wherein, in step a), said raw impeller part is formed such that said raw impeller part comprises, at said inner surface of said at least one channel, extra material in excess of a design contour of said inner surface, said extra material extending into the interior of the channel, forming a factual contour of said inner surface, wherein in said second area a thickness of said extra material is less than in at least part of said first area.

6. The method of claim 5, wherein, in an intermediate region, which is part of said first area and connecting to said second area, a thickness of said extra material changes from the thickness in said second area into the thickness in first second area outside of said intermediate region.

7. The method of claim 6, wherein a transition of the thickness of said extra material at a border between said second area and said intermediate region is tangential with respect to said design contour of said inner surface, and/or wherein a transition of the thickness of said extra material at a border between said intermediate region and the remaining part of said first area is tangential with respect to said design contour of said inner surface.

8. The method of claim 6, wherein the thickness of said extra material is uniform within said first area outside of said intermediate region.

9. The method of claim 8, wherein, in c), at least part of remaining extra material in said intermediate region is removed by means of machining.

10. The method of claim 5, wherein the thickness of said extra material is uniform within said second area.

11. The method of claim 10, wherein, in an intermediate region, which is part of said first area and connecting to said second area, a thickness of said extra material changes from the thickness in said second area into the thickness in first second area outside of said intermediate region.

12. The method of claim 11, wherein the thickness of said extra material is uniform within said first area outside of said intermediate region.

13. The method of claim 12, wherein, in c), at least part of remaining extra material in said intermediate region is removed by means of machining.

14. The method of claim 12, wherein a transition of the thickness of said extra material at a border between said second area and said intermediate region is tangential with respect to said design contour of said inner surface, and/or wherein a transition of the thickness of said extra material at a border between said intermediate region and the remaining part of said first area is tangential with respect to said design contour of said inner surface.

15. The method of claim 14, wherein, in c), at least part of remaining extra material in said intermediate region is removed by means of machining.

* * * * *